United States Patent
Krishnamurthy et al.

(10) Patent No.: US 7,953,912 B2
(45) Date of Patent: May 31, 2011

(54) GUIDED ATTACHMENT OF ACCELERATORS TO COMPUTER SYSTEMS

(75) Inventors: Rajaram B. Krishnamurthy, Wappingers Falls, NY (US); Hong Deng, Poughkeepsie, NY (US); Tjomas A. Gregg, Highland, NY (US); John P. Rankin, Danbury, CT (US)

(73) Assignee: International Business Machines Corporation, Armonk, NY (US)

( * ) Notice: Subject to any disclaimer, the term of this patent is extended or adjusted under 35 U.S.C. 154(b) by 119 days.

(21) Appl. No.: 12/035,513

(22) Filed: Feb. 22, 2008

(65) Prior Publication Data

US 2009/0213127 A1  Aug. 27, 2009

(51) Int. Cl.
*G06F 13/00* (2006.01)
*H05K 7/10* (2006.01)
*G06F 3/00* (2006.01)

(52) U.S. Cl. ............ 710/100; 710/15; 710/18; 710/43; 710/301; 710/302; 710/300; 712/1; 714/47; 345/502; 345/503; 713/320

(58) Field of Classification Search .................. 710/43, 710/301, 302, 300; 712/1; 714/47; 345/502, 345/503

See application file for complete search history.

(56) References Cited

U.S. PATENT DOCUMENTS

| | | | | |
|---|---|---|---|---|
| 5,859,988 A * | 1/1999 | Ajanovic et al. | ............... | 710/306 |
| 6,061,754 A * | 5/2000 | Cepulis et al. | ................ | 710/312 |
| 6,298,370 B1 | 10/2001 | Tang et al. | | |
| 6,317,803 B1 | 11/2001 | Rasmussen et al. | | |
| 6,772,218 B1 | 8/2004 | Noel, Jr. et al. | | |
| 6,961,794 B2 * | 11/2005 | Atherton et al. | ............... | 710/301 |
| 6,999,894 B2 * | 2/2006 | Lin et al. | ................ | 702/179 |
| 7,093,147 B2 * | 8/2006 | Farkas et al. | ................... | 713/320 |
| 7,103,695 B2 * | 9/2006 | Peil et al. | ........................ | 710/301 |
| 7,426,597 B1 * | 9/2008 | Tsu et al. | ........................ | 710/307 |
| 7,600,155 B1 * | 10/2009 | Nickolls et al. | ................ | 714/38 |
| 7,619,629 B1 * | 11/2009 | Danilak | ......................... | 345/502 |
| 2003/0126346 A1 * | 7/2003 | Kuo | .............................. | 710/311 |
| 2005/0200627 A1 * | 9/2005 | Desylva | ......................... | 345/520 |
| 2007/0074004 A1 | 3/2007 | Wong et al. | | |
| 2008/0165196 A1 * | 7/2008 | Bakalash et al. | ............... | 345/505 |

FOREIGN PATENT DOCUMENTS

WO       2006112844 A1    10/2006

OTHER PUBLICATIONS z/Architecture Principles of Operation, International Business Machines Corporation, SA22-7832-05, Sixth Edition (Apr. 2007).

Theo Ungerer et al., "A Survey of Processors with Explicit Multithreading", ACm Computing Surveys, vol. 35, No. 1, Mar. 2003, pp. 29-63.

Rudrajit Samanta et al., "Hybrid Sort-First and Sort-Last Parallel Rendering with a Cluster of PCs", pp. 97-108.

Manjunath Kuslar et al., "Streamroller: Automatic Synthesis of Prescribed Throughput Accelerator Pipelines", CODES +ISSS'06, Oct. 22-25, 2006, Seoul, Korea, pp. 270-275.

* cited by examiner

*Primary Examiner* — Brian T Misiura
(74) *Attorney, Agent, or Firm* — Cantor Colburn LLP; Steven Chiu

(57) ABSTRACT

A method of guided attachment of hardware accelerators to slots of a computing system includes dividing a first group of hardware accelerators into a plurality of priority classes, dividing a first group of slots of the computing system into a plurality of hierarchical tiers, and attaching each hardware accelerator of the first group of hardware accelerators to a slot matched to the hardware accelerators based on comparison of a priority class of the hardware accelerator and a hierarchical tier of the slot.

19 Claims, 4 Drawing Sheets

GUIDED ATTACHMENT OF ACCELERATORS TO COMPUTER SYSTEMS

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

Generally, example embodiments of the present disclosure relate to hardware accelerators, and more particularly to providing a method, system, and computer program product for streaming attachment of hardware accelerators to computing systems.

General purpose processors like Intel®, AMD® and IBM POWER® are designed to support a wide range of workloads. If processing power beyond existing capabilities are required then hardware accelerators may be attached to a computer system to meet requirements of a particular application. Examples of hardware accelerators include FPGAs (Field Programmable Gate Arrays), the IBM Cell B.E. (broadband engine) processor, and graphics processing units (GPUs). Hardware accelerators are typically programmable to allow specialization of a hardware accelerator to a particular task or function and consist of a combination of software, hardware, and firmware. Such hardware accelerators may be attached directly to the processor complex or nest, by PCI-express (peripheral component interconnect) IO (input-output) slots or using high-speed networks, for example, Ethernet and Infiniband®.

Given the large number of attachments points available within computing systems and wide-range of performance characteristics of hardware accelerators, it may be advantageous to automatically provide guidance as to where particular types of hardware accelerators are attached within a computing system in light of the availability for closer placement of accelerators to memory and/or processing units. For example, an attachment hierarchy may include attachment points available within a computing system. However, some problems with general attachment solutions include the lack of automatic guidance for accelerator placement along an attachment hierarchy of a computing system and possibility of performance over-provisioning when arbitrary attachment of accelerators to attachment points is performed.

BRIEF SUMMARY OF THE INVENTION

An example embodiment includes a method of guided attachment of hardware accelerators to slots of a computing system. The method includes dividing a first group of hardware accelerators into a plurality of priority classes, dividing a first group of slots of the computing system into a plurality of hierarchical tiers, and attaching each hardware accelerator of the first group of hardware accelerators to a slot matched to the hardware accelerators based on comparison of a priority class of the hardware accelerator and a hierarchical tier of the slot.

Another example embodiment includes a computing system. The computing system includes a plurality of hardware accelerator attachment slots disposed in decreasing proximity to main components of the computing system, a plurality of interface hubs operatively connecting groups of slots of the plurality of hardware accelerator attachment slots, and means for executing a method of guided attachment of hardware accelerators to the plurality of hardware accelerator attachment slots of the computing system. The method includes dividing a first group of hardware accelerators into a plurality of priority classes, dividing a first group of slots of the plurality of accelerator attachment slots into a plurality of hierarchical tiers based on proximity of each slot to a main component of the computing system, and attaching each hardware accelerator of the first group of hardware accelerators to a slot matched to the hardware accelerators based on comparison of a priority class of the hardware accelerator and a hierarchical tier of the slot.

A further example embodiment includes a computer program product including a computer readable medium with program segments for, when executed on a computer device, causing the computer device to implement a method of guided attachment of hardware accelerators to slots of a computing system. The method includes dividing a first group of hardware accelerators into a plurality of priority classes, dividing a first group of slots of the computing system into a plurality of hierarchical tiers, and attaching each hardware accelerator of the first group of hardware accelerators to a slot matched to the hardware accelerators based on comparison of a priority class of the hardware accelerator and a hierarchical tier of the slot.

BRIEF DESCRIPTION OF THE DRAWINGS

Referring now to the drawings wherein like elements are numbered alike in the several FIGURES.

DETAILED DESCRIPTION OF EXEMPLARY EMBODIMENTS

Figure 1:
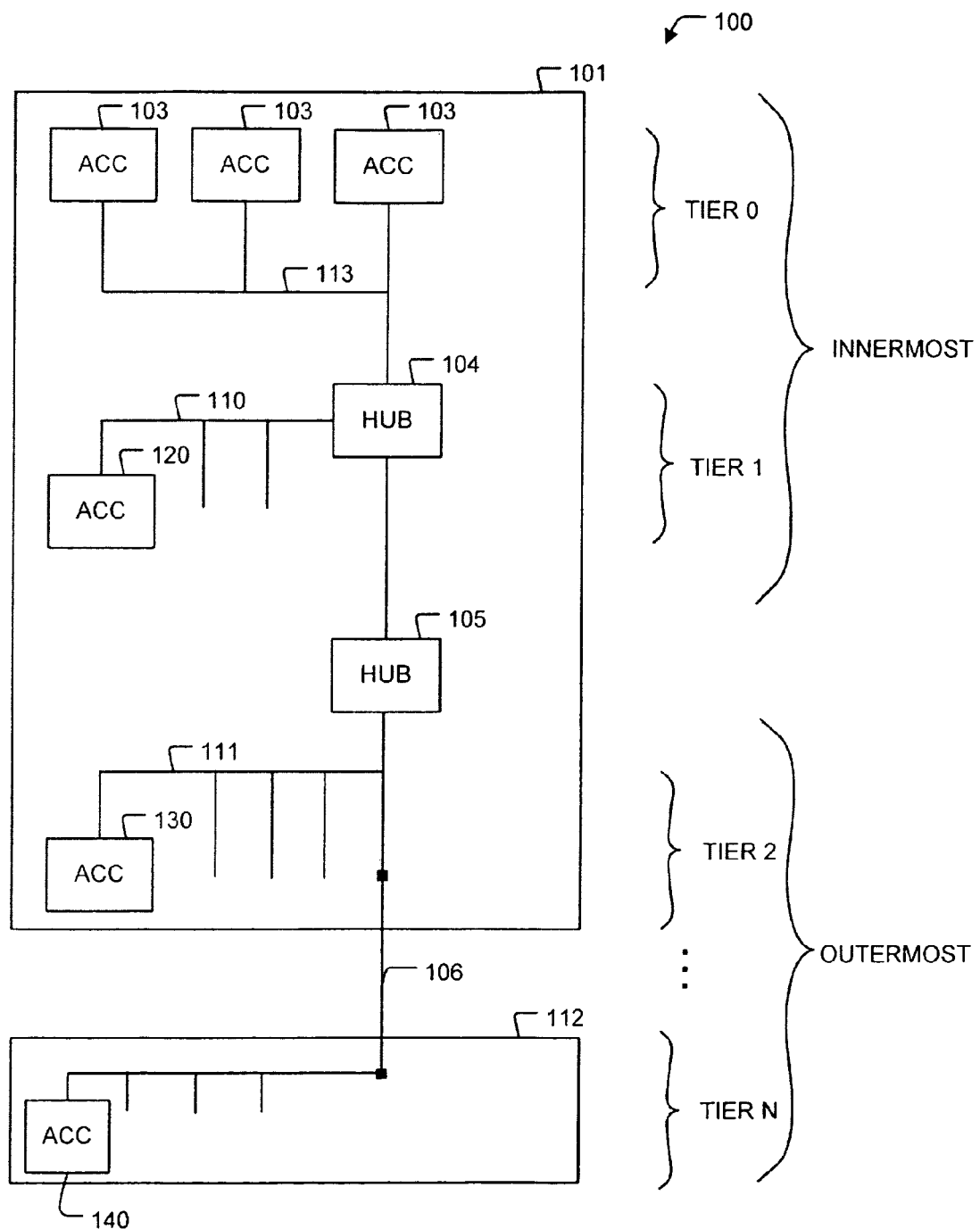
FIG. 1 illustrates an accelerator attachment hierarchy, according to an example embodiment.

Detailed illustrative embodiments are disclosed herein. However, specific functional details disclosed herein are merely representative for purposes of describing example embodiments. Example embodiments may, however, be embodied in many alternate forms and should not be construed as limited to only the embodiments set forth herein.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments.

It should be understood that, although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting of example embodiments.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Hereinafter, example embodiments of the present invention will be described in detail. An example embodiment of the present invention provides automatically guided attachment points for a group of accelerators within a computing system such that increased performance may be achieved. This increase in performance results in efficient use of resources within the computing system.

According to example embodiments, workload-based affinitization (i.e., placement), model-based static placement, and dynamic replacement of hardware accelerators within a computing system may be used to increase performance of accelerators based on placement of said accelerators relatively near processing units utilizing resources of corresponding accelerators. More clearly, accelerators related to tasks associated with a particular processing unit may perform more efficiently if attached near the processing unit. For example, latency and other performance issues may be reduced if compared to placement of accelerators relatively far from processing units performing tasks related to the accelerators.

Turning to FIG. 1, an accelerator attachment hierarchy of a computing system is illustrated. The accelerator hierarchy may be divided into several portions. The innermost hierarchy, the hierarchy of accelerator attachment points closest to the processor(s) of the computing system 100, is illustrated at the upper portion of the computing system 100. The outermost hierarchy, the hierarchy of accelerator attachment points furthest from the processor(s) of the computing system 100, is illustrated at the lower portion of the computing system 100. It is noted that FIG. 1 is provided for illustrative purposes only. For example, any orientation of processors for any suitable computing system may be applicable, and therefore, the particular orientation of the uppermost and outermost hierarchies would change accordingly. It is further noted that the accelerator hierarchy may be divided into any number of portions depending upon any particular computing system.

For example, the accelerator attachment hierarchy may be divided into N hierarchies where N is the number of accelerator attachment hubs in a computing system. Furthermore, each accelerator attachment hierarchy may be divided into M slots where M is the number of slots available for accelerator attachment in each hierarchy. Moreover, any other number of divisions of the accelerator attachment hierarchy may be likewise used depending upon any particular implementation. For simplicity, the terminology "tier <number>" will be used to describe hierarchy levels within the present disclosure. Within the terminology, "<number>" denotes a particular hierarchy level of computing system.

Turning back to FIG. 1, the accelerator hierarchy may include an internal portion 101 and an external portion 112. The internal portion 101 may be a portion of the accelerator hierarchy internal to the computing system. For example, the internal portion 101 may include expansion slots, I/O buses, serial busses, and/or other suitable communications means and attachment means for attaching a hardware accelerator within a computing system. The external portion 112 may be a portion of the accelerator hierarchy external to the computing system (e.g., external I/O cage). For example, the external portion 112 may include expansion slots, I/O busses, serial busses, and/or other suitable communications means and attachment means for attaching a hardware accelerator external to the computing system.

As further illustrated in FIG. 1, the internal portion 101 includes a plurality of communication hubs 104 and 105. It is noted that more or less hubs than illustrated may be applicable to example embodiments. Communication hub 104 may be a "nest interface hub" for interfacing with the CPU (Central Processing Unit) "nest" or processor complex of the computer system. The CPU nest can also accommodate hardware accelerators 103 within a computing system. The CPU nest with hardware accelerators 113 may include accelerators 103 in operative communication with a serial bus or other communications bus closest to the processor(s) of the computing system. The communication hub 104 may further interface with a plurality of slots 110 for attachment of accelerators in relatively close proximity to the processor(s) of the computing system. For example, a hardware accelerator 120 attached to one slot of the plurality of slots 110 is in operative communication with communication hub 104.

Communication hub 105 may be an I/O adaptation hub (or an adaptation layer, adaptation interface, etc) for interfacing with a plurality of traditional I/O slots 111 of the computing system. For example, traditional I/O slots may be serial-based I/O slots not in relatively close proximity to the processor(s) of the computing system. For example, a hardware accelerator 130 may be attached in one or more slots of the plurality of traditional I/O slots 111.

As further illustrated in FIG. 1, the accelerator hierarchy 101 further includes a communications channel 106. The communication channel 106 may allow communications between the internal portion 101 and the external portion 112 through an I/O card (or communications interface) in operative communication with the traditional I/O slots 111. According to at least one example embodiment, the communication channel 106 is a PCI-E "Redrive" channel promoting PCI-E communications between the internal portion 101 and the external portion 112. For example, a hardware accelerator 140 attached within the external portion 112 may communicate with the inner portion 101 through the communication channel 106.

It is noted that the communication hub 104 and the communication hub 105 are in operative communication. Therefore, any hardware accelerators attached through various points within the computing system (103, 120, 130, 140) may be in operative communication as well. Furthermore, hardware accelerators attached to the plurality of slots 110 and 113 may be in relatively close proximity to the processor(s) of the computing system. Similarly, hardware accelerators attached to the plurality of traditional I/O slots 111 or through the external portion 112 may not be in relatively close proximity to the processor(s) of the computing system.

It is further noted that according to at least one example embodiment, the accelerator attachment hierarchy 100 is included within a computing system. The computing system may be a grid computing system, a parallel processor (i.e., one or more parallel processors) computing system, a multi-processor (i.e., one or more processors connected in different configurations) computing system, a computer server system, a high-performance computer server system, and/or any other suitable computing system. The computing system may include a plurality of other components not illustrated. For example, a power source, display unit, peripheral devices, and/or other components may be included within the computing system. However, exhaustive description of every possible component will be omitted herein for the sake of brevity.

As described above, example embodiments of the present invention provide a computing system with an accelerator attachment hierarchy promoting attachment of accelerators within the computing system at different locations relative to the processor(s) of the computing system. The attachment of particular accelerators in different locations may affect performance and/or increase/decrease efficiency depending upon particular requirements of the computing system and accelerators. Hereinafter, methodologies for guided attachment of hardware accelerators within a computing system are described with reference to FIGS. 2-3.

Figure 2:
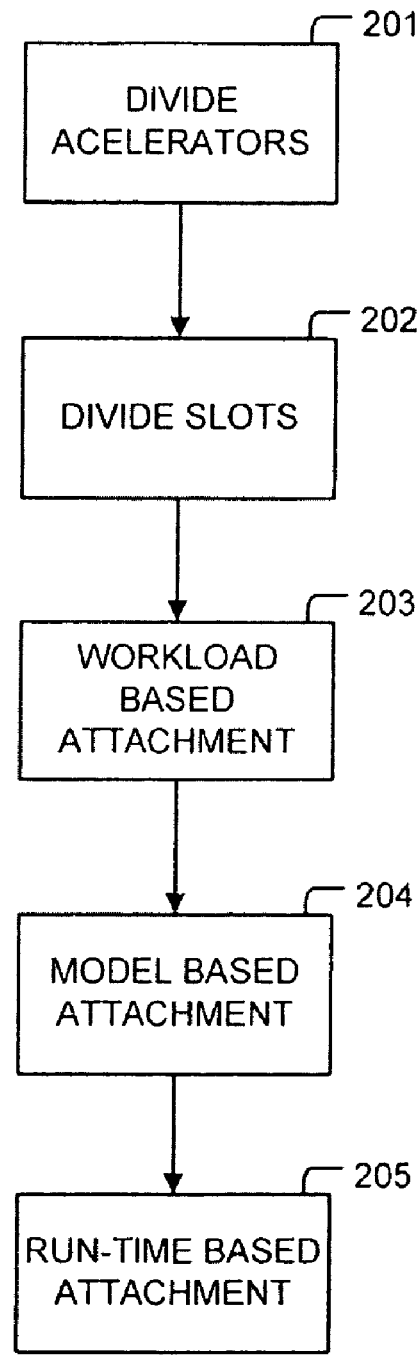
FIG. 2 illustrates a method of guided attachment of accelerators, according to an example embodiment.

Turning to FIG. 2, a method of guided attachment of accelerators is illustrated. The method 200 includes dividing accelerators at block 201 into priority classes. For example, dividing accelerators may include identifying a group of accelerators for a computing system. Each accelerator of the group of accelerators may have a plurality of rated specifications. For example, these rated specifications may be provided by a manufacturer of the accelerator or through recorded performance of the accelerator. The rated specifications may include a jitter rating, a latency rating, a bandwidth rating, and/or other suitable ratings specific to the accelerator. For the purposes of this disclosure, the rated specifications are referred to as an accelerator quality of service (QOS). Through interpretation of an accelerator's QOS, a priority class may be established. For example, a priority class may be a class of a set of priorities defining a desired or predefined performance characteristic of a computing system. The performance characteristic may be the required throughput of the computing system using the group of hardware accelerators or other suitable characteristic. Therefore, according to method 200, the group of accelerators may be divided based on respective accelerator QOS ratings into a plurality of priority classes. In at least one example embodiment of the present invention, a set of accelerators can be divided into priority classes based on relative importance. For example if an XML accelerator (X), a floating point accelerator (FP) and a stream accelerator (S) need to be attached to a computer system and if the relative importance of accelerators is expressed as FP>S>X. In this case, FP can be assigned priority class 3, S with priority class 2 and XML as priority class 1, with higher priority class signifying higher priority.

The method 200 further includes dividing slots at block 202 into hierarchical tiers. For example, dividing slots may include identifying available slots of the computing system. Each slot of the group of slots may have a plurality of ratings associated therewith and may be associated with a location specific to the processor(s) of the computing system as shown in FIG. 1. For example, the ratings may include bandwidth, latency, jitter, memory registration/de-registration times, page pin rate, and/or other similar ratings. These ratings may be previously acquired ratings, manufacturer ratings based on slot location within the computing system, and/or recorded ratings based on slot performance. For the purposes of this disclosure, the ratings of slots of the computing system are referred to as a particular slot's QOS. It should be understood that a QOS rating for a slot may be related to its location with respect to the processor(s) of the computing system. For example, latency and jitter may be reduced for a slot in relatively close proximity to the processor(s) compared to a slot not in relatively close proximity to the processor(s). Therefore, according to method 200, the group of slots may be divided based on respective slot QOS ratings and location within the computing system. For example in FIG. 1, accelerator attachment slots are grouped into Tier 1, Tier 2 and Tier N slot groups. If latency is chosen as a QOS metric, latency to each tier from the CPUs can be ordered as Tier 1<Tier 2<Tier N. Each tier can be assigned a unique integer to order the relative importance of each tier based on latency.

Upon division of the group of accelerators into priority classes and division of the slots into hierarchical classes, the method 200 may include workload-based attachment of accelerators of the group of accelerators within the computing system at block 203. For example, each accelerator may be associated with a particular task or function. Furthermore, different components and/or processors of a computing system may be associated with particular tasks or functions. It follows that initial placement of accelerators may include placement near components and/or processors related to a particular accelerator task. For example, a particular accelerator may be designed for video processing and particular components/processors of the computing system may perform video processing computations. Initial attachment of the particular accelerator in a hierarchy tier within relatively close proximity to the components/processors associated with video processing may be prudent.

The method 200 further includes model-based attachment of accelerators of the group of accelerators within the computing system at block 204. For example, a rated performance value may be assigned to each accelerator. The rated value, termed $P_{rated}$, may be based on rated specifications provided by a manufacturer of the accelerator. For example, rated values might include the 3-tuple (latency, bandwidth, jitter). Furthermore, an expected performance value, termed $P_{expected}$, may be assigned to each accelerator. For example, a workload can express use of an accelerator resource using request rates, data input size and response time. It will be understood that other "models" of accelerator usage are also possible. The expected performance value $P_{expected}$ may be stipulated for a single workload or across multiple workloads. For multiple workloads, the expected value $P_{expected}$ may be based on average values of request rates, data input size and response time across workloads for each accelerator. Finally, the expected performance value or the rated performance value may be matched to a QOS value for a slot in the computing system. If workload based accelerator usage characteristics are unknown then $P_{rated}$ may be used otherwise $P_{expected}$ is used. For example, as slot QOS values have been computed by method 200 (see block 202), the expected and rated values for each accelerator may be compared with slot QOS values to determine if a match has been made. It will be understood that accelerator request rates, data input sizes and expected response time can be transformed to QOS values (latency, bandwidth, jitter) possible for each slot in the computer system. Accelerators may be attached to slots corresponding to matched $P_{rated}$, $P_{expected}$ and slot QOS values.

The method 200 further includes run-time based attachment of accelerators of the group of accelerators within the computing system at block 205. For example, previously attached accelerators may be profiled during operation of the computing system. The latency, jitter, bandwidth, and/or other ratings for each accelerator may be adjusted based on actual application performance and/or run-time profiling. Using the adjusted values, the method 200 may provide guided re-attachment of accelerators to further increase system performance. More clearly, example embodiments provide methodologies for automatic guided reattachment of accelerators based on run-time profiling such that system performance may be further increased from rated and/or expected results. Moreover, as ratings may be adjusted based on run-time profiling, it follows that system administrators or users of the computing system may further alter ratings for any accelerator based on system performance. $P_{rated}$, $P_{expected}$ performance values are based on design time or compile-time information while profile based re-attachment is based on run-time information. As profile based information reflects actual usage of an accelerator resource within a computer system, it can better match an accelerator to a slot of the computer system. As such, example embodiments provide methodologies for guided reattachment of accelerators based on user-profiling of a computing system.

Figure 3:
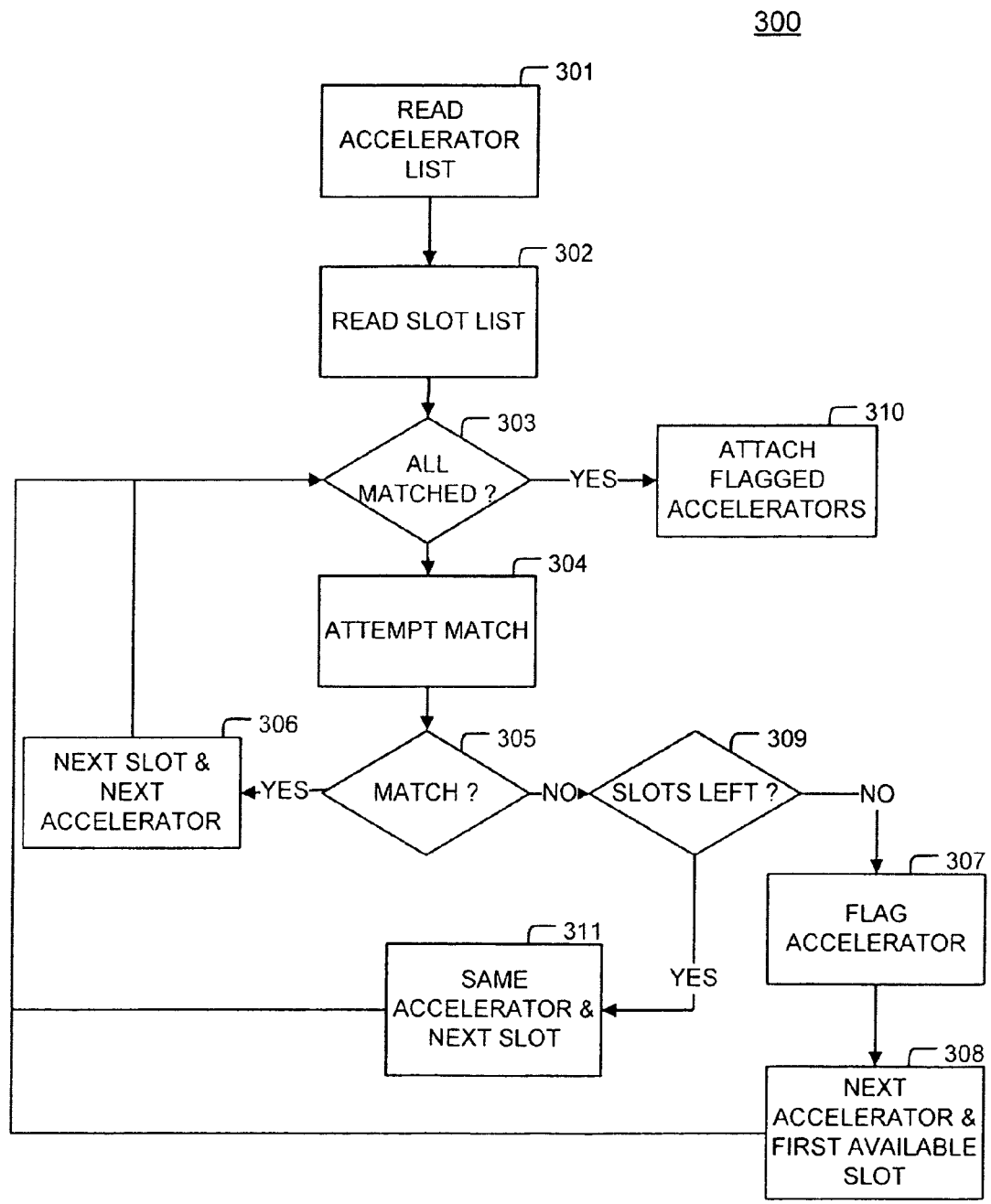
FIG. 3 illustrates a method of guided attachment of accelerators, according to an example embodiment.

Hereinafter, a more detailed explanation of accelerator attachment is provided with reference to FIG. 3. FIG. 3 illustrates a method of guided attachment of accelerators, according to example embodiments. The method 300 includes reading a list of accelerators for attachment in a computing system at block 301. For example, a group of accelerators for attachment may be identified. The group of accelerators may be characterized by serial number, type, or other similar identification means, and may be divided based on priority (see block 201, FIG. 2). The group of accelerators, including identification and priorities, may be read at block 301.

The method 300 further includes reading a list of slots at block 302. For example, a computing system may include a plurality of available slots for accelerator attachment. The plurality of slots may be divided based on QOS, proximity to the processor(s) of the computing system, and/or other performance criteria, and may be divided based on an accelerator attachment hierarchy for the computing system (see block 202, FIG. 2). The group of slots, including identification of slots and associated hierarchies, may be read at block 302.

The method 300 further includes determining if all accelerator performance values (or priority) have been matched (or at least attempted to be matched) to associated slots of the computing system hierarchy at block 303. If all accelerators have not been matched or attempted to be matched, the method includes attempting to match an accelerator performance value (or priority) to a slot at block 304. For example, the method may attempt to match an accelerator of highest priority to an innermost hierarchy level (e.g., "tier 0" of FIG. 1). The method 300 may, at block 304, considers a requested rate of workload for the accelerator, data transmission sizes, and other accelerator usage requirements to compute a bandwidth necessary for attachment at a particular slot. If a match is obtained (see block 305), the method 300 may attempt to match an accelerator for a next slot in the computing system hierarchy (see blocks 306 and 303). If a match is not obtained for any of the slots in the computer system (see blocks 309 and 311), the method 300 may tag or flag the unmatched accelerator for future matching and replacement in blocks 307 and 308.

For example, the method 300 may include tagging an unmatched accelerator at block 307. The unmatched accelerator may be tagged as unmatched within the group of accelerators received at block 301, or may be recorded as unmatched in a listing or log of accelerators. Upon flagging the unmatched accelerator, the method 300 includes attempting to match the next available accelerator from the group of accelerators (see blocks 308 and 303) to the first unmatched slot. The method 300 attempts to match until all accelerator priorities or performance values have been matched (or at least attempted to be matched) to associated slots of the computing system hierarchy (see block 303). If all accelerators have been matched, the method 300 includes attaching flagged accelerators at block 310 to available slots in the computer system's slot hierarchy. This may be completed in a round-robin fashion, matching each accelerator to available slots in the computer system. For example, because the flagged accelerators have not been matched, the flagged accelerators may be attached to outer hierarchy levels. The flagged accelerators may be re-placed using run-time profiling as performed in block 205 of FIG. 2.

It is noted that as all accelerators may be attached using method 300, run-time profiling of the attached accelerators may be performed by the computing system using methodologies similar to those illustrated in FIG. 3. For example, ratings for each accelerator may be altered depending upon actual usage characteristics and/or actual performance. Therefore, the priorities/performance values for each accelerator may be updated through run-time profiling, and in turn, the method 300 may reattach accelerators of the group of accelerators based on the updated values. Therefore, according to method 300, accelerators may be attached to a computing system through model-based matching (see block 204, FIG. 2) and accelerators may be reattached through run-time based profiling (see block 205, FIG. 2). It is further noted that the methodologies illustrated in FIG. 3 may be iterated several times (or even constantly) during computing system execution for increased performance based on run-time profiling of accelerators and/or slots. It will be understood that accelerator priority values may be used to associate accelerators to an IO slot tier and provide "coarse-grained" guidance, while performance values (latency, bandwidth, jitter, workload request rates, data input sizes and response time) may be used to provide "fine-grained" guidance to associate and attach an accelerator to a slot in a given slot tier.

Figure 4:
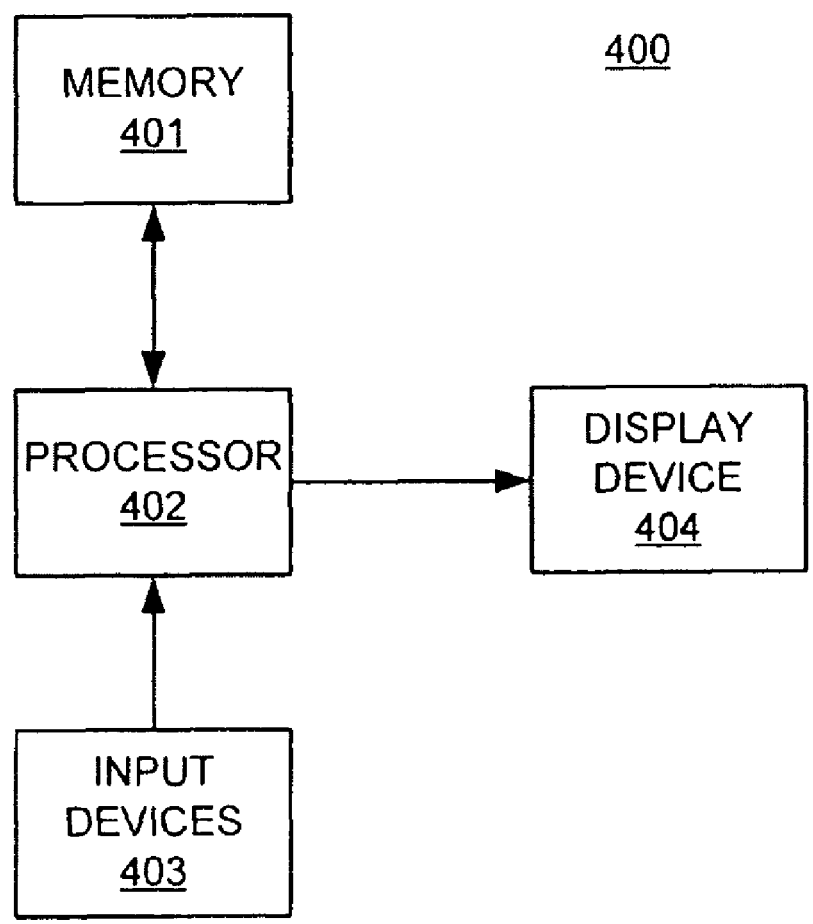
FIG. 4 illustrates a computer apparatus, according to an example embodiment.

It is further noted that embodiments of the invention may be embodied in the form of computer-implemented processes and apparatuses for practicing those processes. Therefore, according to an exemplary embodiment, the methodologies described hereinbefore may be implemented by a computer system or apparatus. For example, FIG. 4 illustrates a computer apparatus, according to an exemplary embodiment. Therefore, portions or the entirety of the methodologies described herein may be executed as instructions in a processor 402 of the computer system 400. The computer system 400 includes memory 401 for storage of instructions and information, input device(s) 403 for computer communication, and display device 404. Thus, the present invention may be implemented, in software, for example, as any suitable computer program on a computer system somewhat similar to computer system 400. For example, a program in accordance with the present invention may be a computer program product causing a computer to execute the example methods described herein.

The computer program product may include a computer-readable medium having computer program logic or code portions embodied thereon for enabling a processor (e.g., 402) of a computer apparatus (e.g., 400) to perform one or more functions in accordance with one or more of the example methodologies described above. The computer program logic may thus cause the processor to perform one or more of the example methodologies, or one or more functions of a given methodology described herein.

The computer-readable storage medium may be a built-in medium installed inside a computer main body or removable medium arranged so that it can be separated from the computer main body. Examples of the built-in medium include, but are not limited to, rewriteable non-volatile memories, such as RAMs, ROMs, flash memories, and hard disks. Examples of a removable medium may include, but are not limited to, optical storage media such as CD-ROMs and DVDs; magneto-optical storage media such as MOs; magnetism storage media such as floppy disks (trademark), cassette tapes, and removable hard disks; media with a built-in rewriteable non-volatile memory such as memory cards; and media with a built-in ROM, such as ROM cassettes.

Further, such programs, when recorded on computer-readable storage media, may be readily stored and distributed. The storage medium, as it is read by a computer, may enable the method(s) disclosed herein, in accordance with an exemplary embodiment of the present invention.

With example embodiments of the present invention having thus been described, it will be obvious that the same may be varied in many ways. The description of the invention hereinbefore uses these examples, including the best mode, to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Such variations are not to be regarded as a departure from the spirit and scope of the present invention, and all such modifications are intended to be included within the scope of the present invention as stated in the following claims.

The invention claimed is:

1. A method of guided attachment of hardware accelerators to slots of a computing system, comprising:
    dividing a first group of hardware accelerators into a plurality of priority classes based upon run-time profiling of the first group of hardware accelerators, wherein the run-time profiling includes profiling each hardware accelerator during execution of the computing system with each hardware accelerator attached to the slots of the computing system, and the run-time profiling for each hardware accelerator occurs across all workloads and all users of the computer system;
    dividing a first group of slots of the computing system into a plurality of hierarchical tiers; and
    attaching each hardware accelerator of the first group of hardware accelerators to a slot matched to the hardware accelerators based on comparison of a priority class of the hardware accelerator and a hierarchical tier of the slot.

2. The method of claim 1, wherein dividing the first group of hardware accelerators includes:
    identifying a quality of service (QOS) measurement for each hardware accelerator of the first group of hardware accelerators; and
    establishing a priority class for each hardware accelerator of the first group of hardware accelerators based on the QOS measurement for each hardware accelerator.

3. The method of claim 2, wherein the QOS measurement includes at least one of a jitter rating, a latency rating, and a bandwidth rating.

4. The method of claim 2, wherein identifying the QOS measurement includes one of the run-time profiling, user-profiling, rated specification, and expected specification of each accelerator.

5. The method of claim 4, wherein user-profiling includes profiling each hardware accelerator based on all workloads run concurrently by a single user of the computer system.

6. The method of claim 4, wherein rated specification includes specifying each hardware accelerator based on a set of manufacturer provided ratings for each hardware accelerator.

7. The method of claim 4, wherein expected specification includes specifying each hardware accelerator based on one of:
    request rates, data input sizes, and expected response times for a single workload; and
    an average request rate, data input sizes and expected response times across a set of concurrently running workloads.

8. The method of claim 1, wherein dividing the first group of slots includes:
    identifying a quality of service (QOS) measurement for each slot of the first group of slots; and
    establishing a hierarchical tier for each slot of the first group of slots based on the QOS measurement for each slot and a proximity of each slot to a main component of the computing system.

9. The method of claim 8, wherein the main component of the computing system is one of a processor, a memory, a communication bus, and a hardware accelerator.

10. The method of claim 8, wherein the QOS measurement includes at least one of a jitter rating, a latency rating, and a bandwidth rating.

11. The method of claim 8, wherein identifying the QOS measurement includes identifying one of a manufacture-time specification and a run-time profiling of each slot.

12. The method of claim 11, wherein manufacture-time specification includes a QOS specification of each slot upon manufacture of the computing system.

13. The method of claim 11, wherein run-time profiling includes profiling each slot based on observation of performance of each slot without attachment of hardware accelerators.

14. The method of claim 1, wherein:
    attaching each hardware accelerator includes work-load based attachment of each hardware accelerator; and
    work-load based attachment includes attachment of a hardware accelerator in relatively close proximity to a computing system component related to functions of the hardware accelerator.

15. The method of claim 1, wherein:
    attaching each hardware accelerator includes model-based attachment of each hardware accelerator; and
    model-based attachment includes attachment of a hardware accelerator in a slot based on comparison of one of rated performance value of the hardware accelerator, an expected performance value of the hardware accelerator, and a hierarchical tier of a proposed slot.

16. The method of claim 1, further comprising:
    attempting to match each hardware accelerator to a slot of the first group of slots;
    establishing a second group of hardware accelerators based on the attempting; and
    attaching each hardware accelerator of the second group of hardware accelerators to the lowest hierarchical tiers of the first group of slots.

17. The method of claim 16, wherein establishing the second group of hardware accelerators includes flagging hardware accelerators not matched in the attempting as unmatched hardware accelerators.

18. A computing system, comprising:
a plurality of hardware accelerator attachment slots disposed in decreasing proximity to main components of the computing system; and
a plurality of interface hubs operatively connecting groups of slots of the plurality of hardware accelerator attachment slots;
wherein the computing system is configured to perform a method of guided attachment of hardware accelerators, the method comprising:
dividing a first group of hardware accelerators into a plurality of priority classes based upon run-time profiling of the first group of hardware accelerators, wherein the run-time profiling includes profiling each hardware accelerator during execution of the computing system with each hardware accelerator attached to slots of the computing system, and the run-time profiling for each hardware accelerator occurs across all workloads and all users of the computer system;
dividing a first group of slots of the plurality of accelerator attachment slots into a plurality of hierarchical tiers based on proximity of each slot to a main component of the computing system; and
attaching each hardware accelerator of the first group of hardware accelerators to a slot matched to the hardware accelerators based on comparison of a priority class of the hardware accelerator and a hierarchical tier of the slot.

19. A computer program product including a computer readable storage medium with program segments embodied thereon that, when executed on a computer device, cause the computer device to implement a method of guided attachment of hardware accelerators to slots of a computing system, the method comprising:
dividing a first group of hardware accelerators into a plurality of priority classes based upon run-time profiling of the first group of hardware accelerators, wherein the run-time profiling includes profiling each hardware accelerator during execution of the computing system with each hardware accelerator attached to slots of the computing system, and the run-time profiling for each hardware accelerator occurs across all workloads and all users of the computer system;
dividing a first group of slots of the computing system into a plurality of hierarchical tiers; and
attaching each hardware accelerator of the first group of hardware accelerators to a slot matched to the hardware accelerators based on comparison of a priority class of the hardware accelerator and a hierarchical tier of the slot.

* * * * *